Jan. 27, 1953 W. NEUGEBAUER ET AL 2,626,866
PROCESS OF FIXING LITHOGRAPHIC DIAZOTYPE PRINTING FOILS WHICH HAVE BEEN EXPOSED TO LIGHT
Filed Jan. 13, 1949
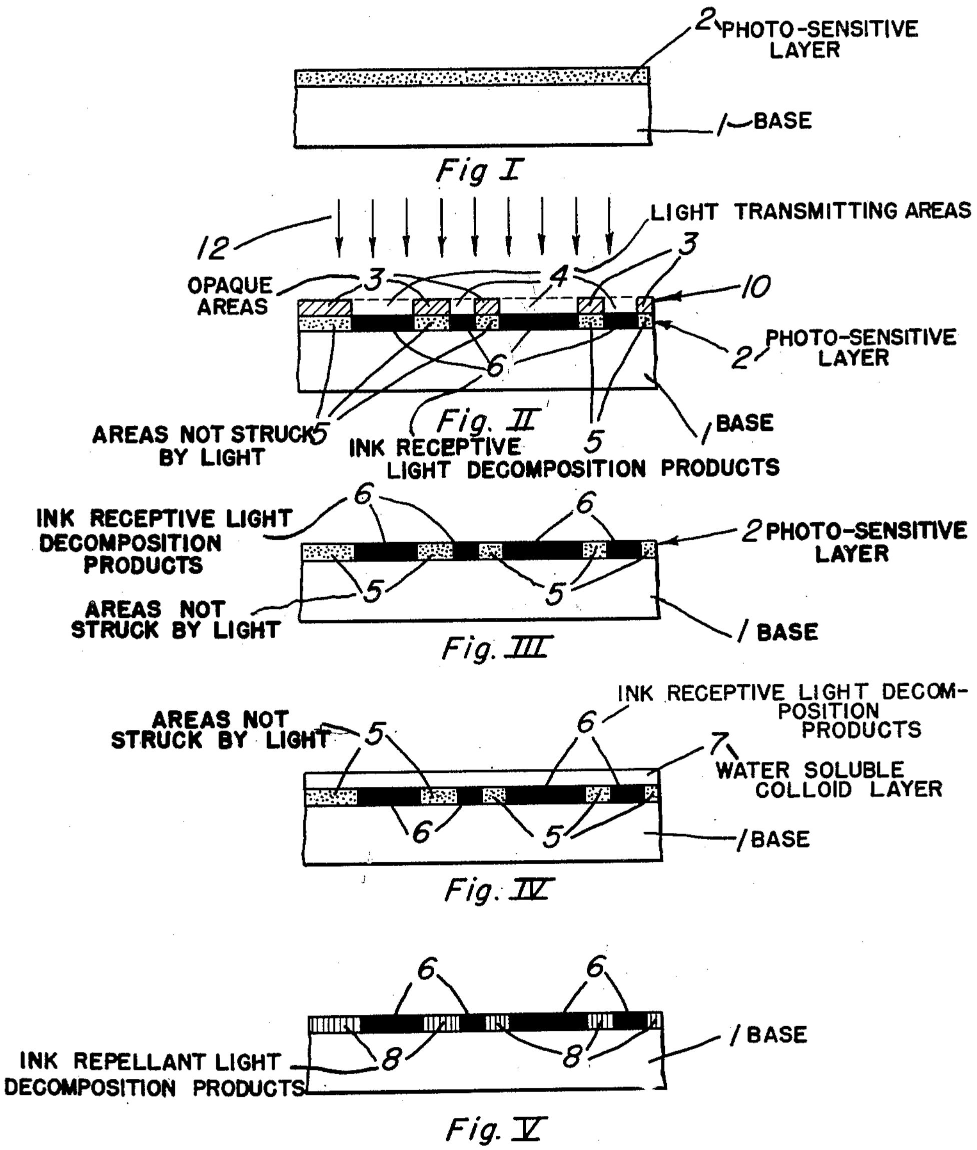
Fig I, Fig. II, Fig. III, Fig. IV, Fig. V
INVENTORS
Wilhelm Neugebauer
Jakob Barthenheier
BY
Pierce, Scheffler & Parker
their ATTORNEYS Patented Jan. 27, 1953 2,626,866

UNITED STATES PATENT OFFICE 2,626,866

PROCESS OF FIXING LITHOGRAPHIC DIAZOTYPE PRINTING FOILS WHICH HAVE BEEN EXPOSED TO LIGHT

Wilhelm Neugebauer, Wiesbaden-Biebrich, and Jakob Barthenheier, Eddersheim-on-the-Main, Germany, assignors to Kalle & Co. Aktiengesellschaft, Wiesbaden-Biebrich, Germany Application January 13, 1949, Serial No. 70,802
In Germany October 1, 1948

8 Claims. (Cl. 95—5.4)

This invention relates to a new process of fixing photosensitive lithographic printing foils. In particular, the invention relates to photo-sensitive foils provided with a light sensitive layer containing suitable diazo compounds as sensitizing agents. By exposing such foils to light under a master, the printing foil is produced. The fixing of the exposed photosensitive lithographic foil herein taught has the purpose of stabilizing the printing foil against further light influence.

Recently printing foils which are intended to be used in lithography, namely in flat and offset printing, have been produced from foils which have been photo-sensitized by coating them with a layer containing light sensitive diazo compounds. The photo-sensitized foils are exposed to light under an original and the light-decomposition products which are formed in all areas struck directly by light, permit the adherence of fatty inks so that these areas become ink receptive. Originally, soluble colloids, such as gum arabic or albuminous substances, were incorporated into the light sensitive layer of the foil. It was found, however, that the light-decomposition products of the diazo compounds in the wet state are very receptive to the fatty ink necessary for the reproduction of the image by printing. Therefore the practice of adding colloids to the light sensitive layer has been dropped.

Reference is made in this connection to the pending U. S. patent application Serial No. 55,228, filed on October 18, 1948, in the names of W. Neugebauer, J. Barthenheier, and A. Rebenstock. In this process diazo compounds are used for photo-sensitizing the foil. These diazo compounds are changed into insoluble decomposition products under the action of light. The decomposition products accept fatty ink in the presence of water. Positive images and prints are produced in this case, if the foil is exposed to light under a negative; negative images and prints result from exposure under a positive.

The foils exposed as heretofore described must be protected against further direct action of light, before being developed to the final state. Otherwise it would be necessary to make them insensitive to the influence of light. In this regard, it has been recommended that the undecomposed diazo compound be washed out after the exposure of the foil. Treatment of the exposed photosensitive foil with the sodium salt of thiosulfonic acid has likewise been proposed. The effect of these methods is not perfectly satisfactory, because the total removal of all undecomposed diazo compound by application of water is difficult and even a treatment with water over a long time does not secure the desired effect. Treating the exposed foil with a thiosulfuric acid salt does not produce satisfactory fixing in all respects. Foils which have been fixed as described above have a strong toning tendency which becomes evident, if the foils are used for printing.

Now we have found, that the photosensitive foils above referred to, which are coated with a suitable diazo compound as a sensitizing agent, such as has been disclosed in the pending U. S. patent application Serial No. 55,228 filed on October 18, 1948, in the names of W. Neugebauer, J. Barthenheier, A. Rebenstock, can be fixed in the intermediary state and an excellent stability against light action procured, if the foil, after its exposure to light under an original, is provided with a water soluble film-forming organic colloid coating and then, with or without being dried, reexposed to light, this time without using an original.

The invention will be more fully understood by reference to the following description taken in conjunction with the attached drawing in which Figure I is a view in diagrammatic sectional elevation showing a photosensitive foil.

Figure II is a view in diagrammatic sectional elevation showing the photosensitive foil being exposed to light under an original.

Figure III is a view in diagrammatic sectional elevation showing the exposed foil after the original has been removed.

Figure IV is a view in diagrammatic sectional elevation showing the exposed foil with a water soluble material applied to the surface thereof.

Figure V is a view in diagrammatic sectional elevation showing the completed lithographic printing foil resulting from a complete re-exposure of the coated foil shown in Figure IV followed by removal of the water soluble material.

The photosensitive foil shown in Figure I, made up of the base 1 and photosensitive material 2 is exposed under an original 10 as shown in Figure II. The light 12 is blocked by the opaque areas 3 of the original 10, so that the areas 5 of the photo-sensitive material 2 under the areas 3 remain unchanged. The areas 4 of the original permit the passage of the light 12 to the areas 6 of the photo-sensitive material 2 so that the photo-sensitive material is decomposed in the areas 6 in the form of a pattern as illustrated. In Figure III the foil 1 is shown with the photosensitive material 2 decomposed in areas 6 and undecomposed in areas 5. Subsequently, the exposed foil is coated with a water soluble material 7 as shown in Figure IV. The coated exposed foil, as shown in Figure IV will not be harmed by the further action of light; i. e. no new ink receptive light decomposition products of the diazo compound will be formed.

Figure V shows the completed lithographic printing material resulting from the reexposure of the material shown in Figure IV and removal of the water soluble substance 7. In Figure V, the decomposition products on the base 1 are ink receptive in the areas 6 and non-ink receptive in the areas 8 in the presence of water. If the foils coated in accordance with the present invention are exposed again to light, the diazo compound is certainly decomposed, those parts of the foil which have been struck by the light, only after being protected by the water soluble organic colloid coating, will not accept fatty ink, if water is present to wet these parts. This is in contrast to those parts of the foil covered with light decomposition products which resulted from the first exposure of the uncoated photosensitive material through the original, which latter decomposition products will accept fatty ink.

If colored diazo compounds have been used for sensitizing the foil, the progress of fixing the foil can be observed because it is accompanied by the fading of the diazo compound. It is a very surprising fact, that all areas which have been exposed to light under a water soluble substance according to the present invention and which have faded in consequence of the light action do not take fatty ink, if they are smeared with such ink while wet.

The exposure of the foil to light under the water soluble organic colloid substance brings about a permanent fixing of the preformed image. But if only the water soluble organic colloid substance is applied to the foil after its first exposure under an original and the foil is subsequently not reexposed to light, the foil is only protected against the action of light as long as the coating remains. If the water soluble organic colloid substance is removed, for instance by washing off with water, the foil may again be made completely ink receptive by the action of light. Reapplication of a water soluble organic colloid substance according to the invention provides renewed protection of the foil to the action of light.

The permanent fixing of the exposed foil by reexposure to light under a water soluble organic colloid substance can be performed immediately after the application of the coating or after the foil has been dried subsequently. In case, storing of the exposed foil covered with the water soluble organic colloid substance in wet or dry state seems to be preferable, the necessary exposure to light under the coating may be effected later on. In the last mentioned case, substances which do not show a sticking tendency when dry are preferred for producing the coatings.

The water soluble organic colloid substances useful in our present invention include almost all water soluble organic colloid substances which form a coherent layer, particularly such substances which preserve the form of a coherent film-like coating even after having dried. Good results are obtained with the solutions of the following susbtances: dextrine, gum arabic, cellulose ethers, polyuronic acids and the salts thereof, polyvinyl alcohol, polyvinyl pyrrolidones, water soluble urea resins, proteins, polyethylene-oxide, pectin, sodium alginate, hydrogum, guar resin, and others. Guar resin is defined in the Journal of the American Chemical Society, vol. 70 (1948), pages 2221 and 2222, as polysaccharide (mannogalactan). Hydrogum is the commercial name used by the Harris-Seybold Company for the mesquite gum which it sells. The aqueous solution to be applied to the exposed foil may contain one of these substances alone or the solution may contain mixtures of these substances. Preferably they are applied in the form of a solution containing about 10% of the film-forming substance. Glycerin too produces a good coating.

We give the following particulars by way of example in order to illustrate our present invention:

(1) A cellulose acetate foil, saponified on its surface, is coated, by means of a cotton swab, with a 3% aqueous solution of the zinc chloride double salt of the diazo compound which is produced by condensing 1 mol. of the sulfate of diazo-diphenylamine with 1 mol. of paraformaldehyde in sulfuric acid of 60° Bé. The excess is removed by rubbing and the foil is then dried. The dried foil is exposed to light under a negative and subsequently an albumin coating is applied to the exposed foil by brushing with an 8% aqueous solution of albumin. The coating is dried and the foil is completely exposed to light once more for the purpose of fixing the preformed image.

(2) A 3% aqueous solution of the sulfonate of the diazo compound of 4-amino-1-(N-2,3,4,6-tetrachlorobenzyl)-aminobenzene is brushed on a parchment paper sheet and dried by rubbing. The foil thus produced is exposed to light under a negative, subsequently smeared with a 6% aqueous dextrine solution and while moist exposed to light once more, no original being used in the course of the second exposure. The foil is now insensitive to further light influence.

After having duly described our invention we claim:

1. In a process for making a lithographic printing material, from photosensitive material sensitized with a light sensitive diazo compound which upon exposure to light decomposes into a fatty ink receptive substance, by exposing the photosensitive surface of said material to light through an original, the fixing method comprising the steps of treating said exposed surface of the material with an aqueous solution containing a water soluble organic colloid substance to coat said exposed surface of said material with a layer of said water soluble organic colloid substance and subjecting said coated material once more to the action of light without using an original, whereby said material will be no longer capable of being affected by light but upon removal of said water soluble organic colloid substance said material will be capable of functioning as a lithographic printing plate.

2. In a process for making a lithographic printing material, from a photo-sensitive material sensitized with a light sensitive diazo compound which upon exposure to light decomposes into a fatty ink receptive substance, by exposing the photo-sensitive surface of said material to light through an original, the fixing method comprising the steps of treating said exposed surface of the material with an aqueous solution containing a water soluble colloid substance selected from the group consisting of dextrine, gum arabic, cellulose ethers, polyuronic acids and the salts thereof, polyvinyl alcohol, polyvinyl pyrrolidones, water soluble urea resins, proteins, polyethylene-oxide, pectin, sodium alginate, mesquite gum and guar resin to coat said exposed surface of said material with a layer of said water soluble colloid substance and subjecting said coated material once more to the action of light without using an original, whereby said material will be no longer capable of being affected by light but upon removal of said water soluble colloid substance said material will be capable of functioning as a lithographic printing plate.

3. In a process for making a lithographic printing material, from a photo-sensitive material sensitized with a light sensitive diazo compound which upon exposure to light decomposes into a fatty ink receptive substance, by exposing the photosensitive surface of said material to light through an original, the fixing method comprising the steps of treating said exposed surface of the material with an aqueous dextrine solution to coat said exposed surface of said material with a layer of dextrine and subjecting said coated material once more to the action of light without using an original, whereby said material will be no longer capable of being affected by light but upon removal of said dextrine layer said material will be capable of functioning as a lithographic printing plate.

4. In a process for making a lithographic printing material, from a photosensitive foil sensitized with a light sensitive diazo compound which upon exposure to light decomposes into a fatty ink receptive substance, by exposing the photosensitive surface of said material to light through an original, the fixing method comprising the steps of treating said exposed surface of the material with an aqueous protein solution to coat said exposed surface of said material with a layer of protein and subjecting said coated material once more to the action of light without using an original, whereby said material will be no longer capable of being affected by light but upon removal of said protein layer said material will be capable of functioning as a lithographic printing plate.

5. In a process for making a lithographic printing material from a photo-sensitive material sensitized with a light sensitive diazo compound which upon exposure to light decomposes into a fatty ink receptive substance, by exposing the photosensitive surface of said material to light through an original, the fixing method comprising the steps of treating said exposed surface of the material with an aqueous colloidal gum solution to coat said exposed surface of said material with a water soluble colloid gum layer and subjecting said coated material once more to the action of light without using an original, whereby said material will be no longer capable of being affected by light but upon removal of said water soluble colloid gum layer said material will be capable of functioning as a lithographic printing plate.

6. In a process for making a lithographic printing material from a photo-sensitive material sensitized with a light sensitive diazo compound which upon exposure to light decomposes into a fatty ink receptive substance, by exposing the photosensitive surface of said material to light through an original, the fixing method comprising the steps of treating said exposed surface of the material with an aqueous gum arabic solution to coat said exposed surface of said material with a gum arabic layer and subjecting said coated material once more to the action of light without using an original, whereby said material will be no longer capable of being affected by light but upon removal of said gum arabic layer said material will be capable of functioning as a lithographic printing plate.

7. In a process for making a lithographic printing material from a photo-sensitive material sensitized with a light sensitive diazo compound which upon exposure to light decomposes into a fatty ink receptive substance, by exposing the photosensitive surface of said material to light through an original, the fixing method comprising the steps of treating said exposed surface of the material with an aqueous mesquite gum solution to coat said exposed surface of said material with a mesquite gum layer and subjecting said coated material once more to the action of light without using an original, whereby said material will be no longer capable of being affected by light but upon removal of said mesquite gum layer said material will be capable of functioning as a lithographic printing plate.

8. In a process for making a lithographic printing material from a photo-sensitive material sensitized with a light sensitive diazo compound which upon exposure to light decomposes into a fatty ink receptive substance, by exposing the photosensitive surface of said material to light through an original, the fixing method comprising the steps of treating said exposed surface of the material with an aqueous solution of guar resin to coat said exposed surface of said material with a layer of guar resin and subjecting said coated material once more to the action of light without using an original, whereby said material will be no longer capable of being affected by light but upon removal of said layer of guar resin said material will be capable of functioning as a lithographic printing plate.

WILHELM NEUGEBAUER.
JAKOB BARTHENHEIER.

REFERENCES CITED

The following references are of record in the file of this patent:

UNITED STATES PATENTS

| Number | Name | Date |
|---|---|---|
| 1,926,322 | Van der Grinten | Sept. 12, 1933 |